(12) United States Patent
Saito (10) Patent No.: US 7,010,170 B2
(45) Date of Patent: Mar. 7, 2006

(54) IMAGE CODING DEVICE AND METHOD

(75) Inventor: Hiroshi Saito, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 664 days.

(21) Appl. No.: 10/190,212

(22) Filed: Jul. 3, 2002

(65) Prior Publication Data
US 2003/0007696 A1    Jan. 9, 2003

(30) Foreign Application Priority Data
Jul. 4, 2001    (JP)    ............................ 2001-203014

(51) Int. Cl.
*G06K 9/36* (2006.01)
*G06K 9/46* (2006.01)
(52) U.S. Cl. ...................... 382/239; 382/251
(58) Field of Classification Search ............... 382/239, 382/232, 251
See application file for complete search history.

(56) References Cited

U.S. PATENT DOCUMENTS 6,351,568 B1 *    2/2002    Andrew ...................... 382/239

* cited by examiner

*Primary Examiner*—Duy M. Dang
(74) *Attorney, Agent, or Firm*—Hamre, Schumann, Mueller & Larson, P.C.

(57) ABSTRACT

To compress and encode an image by dividing the image into units of blocks, a method in which features of each block are detected and different operations are applied according to the features has been used often so as to reduce coding distortion and improve subjective image quality, but this method requires additional information representing features of blocks to be recorded and transmitted together, thereby deteriorating the coding efficiency. A rounding operation with respect to a calculation result is modified so that the rounding operation is varied according to features detected as to each block. By so doing, adaptive compressing and coding is implemented by only the processing upon coding, without recording or transmitting additional information.

18 Claims, 4 Drawing Sheets

IMAGE CODING DEVICE AND METHOD

BACKGROUND OF THE INVENTION

1. Field of the Invention

The present invention relates generally to an image coding method and device that are used for compressing and encoding image data when the data are recorded or transmitted.

2. Related Background Art

Though there are minor differences in image compressing methods according to whether targets are motion pictures or still pictures, many image compressing methods, for instance, the MPEG2 (motion picture expert group second version) method employed in the digital television broadcasting and the like, and the JPEG (joint photographic experts group) commonly employed in digital still cameras, basically deal with images in a state of being divided into blocks. To obtain the highest-possible-quality decoded images with the smallest possible number of codes, various proposals have been made conventionally. To obtain the high image quality in these image compressing methods is, in other words, to discover an optimal solution to a problem of how much among a limited amount of codes should be allocated at which portions on an image. Therefore, image compressing devices with high quality as their characteristic have taken an approach in which features of images are detected in each of the divided blocks and an optimal coding calculation is applied to each. More specifically, in a quantization means as the most basic means in compression calculations, a quantization step is set to be smaller with respect to a block that is considered to have a greater significance, while, in contrast, a quantization step is set to be greater with respect to a block that is considered to have a smaller significance. Thus, by weighting blocks, the optimization of the code amount allocation on a screen has been attempted.

However, in the case where coding parameters such as quantization steps are varied according to the blocks, a problem arises in that data cannot be decoded correctly unless information on coding parameters used when the data are compressed is included in the compressed data when the compressed data are recorded or transmitted. While the subtle control of coding parameters makes it possible to obtain high-quality images, it also increases an amount of additional parameter information to be included. Therefore, it is necessary to determine an appropriate method with a trade-off of the both taken into consideration. Furthermore, in the case where, as in the MPEG2, the international standards provide that a singularity of a quantization step is used with respect to a macro block integrating a plurality of blocks, the plurality of blocks included in the macro block are processed always by the same quantization step. This makes it impossible to carry out a delicate optimal control with respect to each block, which has been considered as a problem.

SUMMARY OF THE INVENTION

Therefore, to solve the aforementioned problems, in the present invention, a feature detection means detects features of images in each block, a classification means classifies the block into one of a plurality of categories according to the result of the detection of features, and a rounding means varies a value of a rounding coefficient according to the category.

A first aspect of the present invention is an image coding device that encodes an image by dividing the image into units of blocks. The image coding device includes: a feature detecting means that detects features of the image as to each block; a classification means that classifies each block into one of a plurality of categories according to a result of the detection by the feature detection means; a calculation means that performs a predetermined calculation and outputs a result of the calculation, the result being a real number; and a rounding means that adds a rounding coefficient R ($R \geq 0$) to the result of the calculation that is the real number, and rounds an addition result to an integer by discarding digits to the right of the decimal point. In the image coding device, the rounding means varies a value of the rounding coefficient R according to the category into which the classification means classifies the block. By controlling the rounding means as to each block, the rounding-off is carried out with respect to a block as a unit with a great significance so that the coding with high precision can be achieved, whereas the rounding-down is carried our with respect to a block with a small significance so that a signal level is rounded down to a low level, whereby an increase in the amount of generated codes can be suppressed. Thus, the weighting of blocks with respect to the amount of the generated codes is implemented.

The feature detection means detects the significance of each block by employing statistical characteristics, an average value of brightness signal levels of each block, an average value of color difference signal levels of each block, and a complexity of each block that is calculated according to a sum of absolute values of finite differences of brightness signal levels $Y_i$ of respective pixels from an average value $Y$ of brightness signal levels, the complexity being given as $P = \Sigma |Y_i - Y|$.

A second aspect of the present invention is an image coding device that encodes an image by dividing the image into units of blocks, and the image coding device includes: a feature detecting means that detects features of the image as to each of the blocks; a classification means that classifies each block into one of a plurality of categories according to a result of the detection by the feature detection means; a calculation means that performs a predetermined calculation for quantization, and outputs a result of the calculation, the result being a real number; a rounding means that adds a rounding coefficient R ($R \geq 0$) to the result of the calculation that is the real number, and rounds an addition result to an integer by discarding digits to the right of the decimal point; a codeword length estimation means that estimates a length of a variable-length code according to a frequency of occurrence of the calculation result rounded to the integer; and a variable-length coding means that actually allocates the variable-length code estimated by the codeword length estimation means to the calculation result so as to encode the calculation result. In the image coding device, the rounding means varies the rounding coefficient R according to the category into which the classification means classifies the block, and in the case where the codeword length estimation means estimates that a length of the variable-length code is reduced, the rounding means sets the rounding coefficient R to the value that causes the length of the variable-length code to be reduced. Thus, the rounding coefficient R is set by estimating the features and the length of the variable-length code of the block, so that the rounding error is minimized while the code length can be shortened by one level.

DETAILED DESCRIPTION OF THE INVENTION

The following will describe embodiments of the present invention.

First Embodiment

Figure 1:
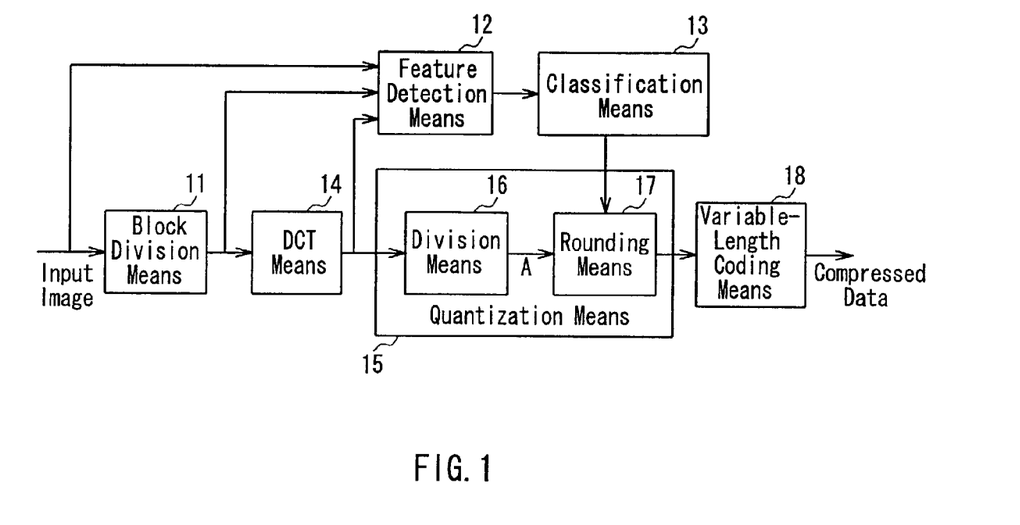
FIG. 1 is a block diagram illustrating a configuration of an image coding device according to a first embodiment of the present invention.

FIG. 1 is a block diagram illustrating a configuration of an image coding device according to the present embodiment, which is described referring to a case in which the present invention is applied in a DCT (discrete cosine transform) coding method such as the MPEG or the JPEG.

In FIG. 1, 11 denotes a block division means that divides an image into blocks. 12 denotes a feature detection means that detects features of an image of each block by employing an input image, an image of the block, a DCT coefficient, and the like. 13 denotes a classification means that classifies the block into one of several categories according to the significance of the block based on a result of the detection by the feature detection means 12. 14 denotes a DCT means that applies DCT to data supplied from the block division means 11. 15 denotes a quantization means that divides a DCT coefficient by a predetermined value and makes the DCT coefficient to be represented in an integer form. 16 denotes a division means as a calculation means that is provided in the quantization means 15 and that divides the supplied data by a predetermined value. 17 denotes a rounding means that is provided inside the quantization means 15 and that rounds the division result of the division means 16 to an integer according to the classification result of the classification means 13. 18 denotes a variable-length coding means that encodes data supplied from the quantization means 15 into a variable-length code.

Figure 2:
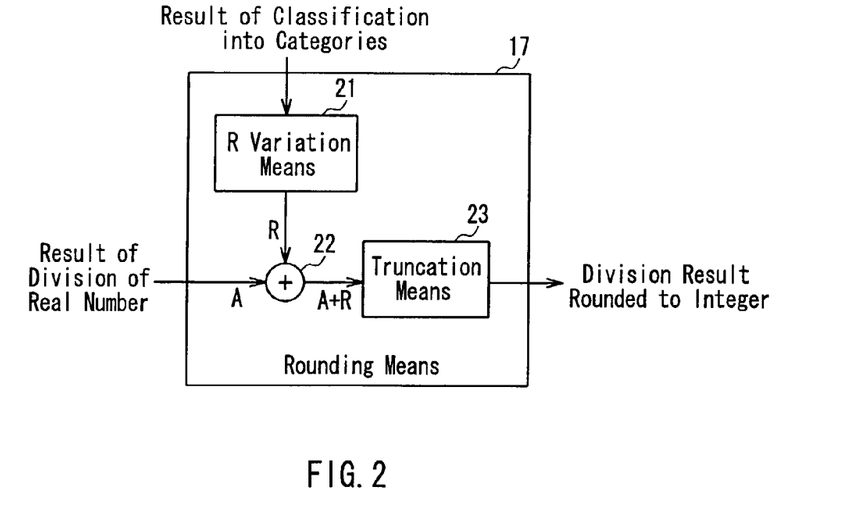
FIG. 2 is a block diagram illustrating an internal configuration of a rounding means according to the first embodiment of the present invention.

Furthermore, FIG. 2 is a block diagram illustrating an internal configuration of the rounding means 17.

In FIG. 2, 21 denotes a R variation means that varies a rounding coefficient R. 22 denotes an addition means that adds the division result of a real number by the division means 16, and the rounding coefficient R supplied from the R variation means 21. 23 denotes a truncation means that truncates the addition result of the addition means 22 by discarding all digits to the right of the decimal point.

The input image is divided into a plurality of blocks by the block dividing means 11, and the subsequent processing is carried out as to each of the blocks. The DCT means 14 subjects an image of each block to orthogonal transformation to obtain a DCT coefficient. The feature detection means 12 detects features of the image of the block by using the input image or images as a result of division into units of blocks, and the DCT coefficient. The quantization means 15 quantizes the DCT coefficient by dividing the DCT coefficient by a predetermined value. Therefore, the quantization means 15 requires therein the division means 16 and the rounding means 17 for rounding the division result of the division means 16 to an integer. The rounding is implemented, as shown in FIG. 2, by adding the rounding coefficient R to the division result that is usually a real number, and thereafter discarding the digits to the right of the decimal point. The division result of the real number supplied from the division means 16 is added by the addition means 22 to the rounding coefficient R supplied by the R variation means 21, and the digits to the right of the decimal point are discarded by the truncation means 23. The DCT coefficient thus quantized and rounded to an integer finally is subjected to variable-length coding by the variable-length coding means 18, so that it is recorded or transmitted in a compression data form.

The configuration described above is similar to a basic configuration of a common image compression method that employs the DCT, such as the configuration of the MPEG or the JPEG, except for the following characteristic: the rounding means 17 of the present invention is capable of varying the rounding coefficient R flexibly according to a category in which an image block is classified by the classification means 13, according to the result of detection by the feature detection means 12. Conventionally, a value having a fraction part generated as a result of a calculation is rounded off so that the value is rounded to an integer commonly. This is because the rounding-off operation causes a rounding error to be minimized arithmetically. However, in the case where all the blocks are subjected to the rounding off operation uniformly, blocks with a great significance in image display and blocks with a small significance in image display each have a uniform rounding error. Presuming that the processing system of compression-decompression is made irreversible by the quantization process, the reduction of coding distortion of a significant block that attracts attention on a screen leads to the improvement of a subjective image quality on the whole, even though it causes an error in a less significant block so as to deteriorate the coding distortion.

Therefore, the rounding means 17 of the present invention is characterized in varying the rounding coefficient R adaptively according to the detection by the feature detection means 12 and the classification by the classification means 13 as to whether a block is significant on a screen. This makes it possible to control a rounding error as to each block, and to prioritize the blocks in detail. Furthermore, since in a decoding operation there is no need to know what rounding operation is applied to each block, it is unnecessary to record or transmit the rounding coefficient R that has been varied adaptively as additional information, thereby making it possible to solve the conventional problem of the increase in the code amount.

Figure 3:
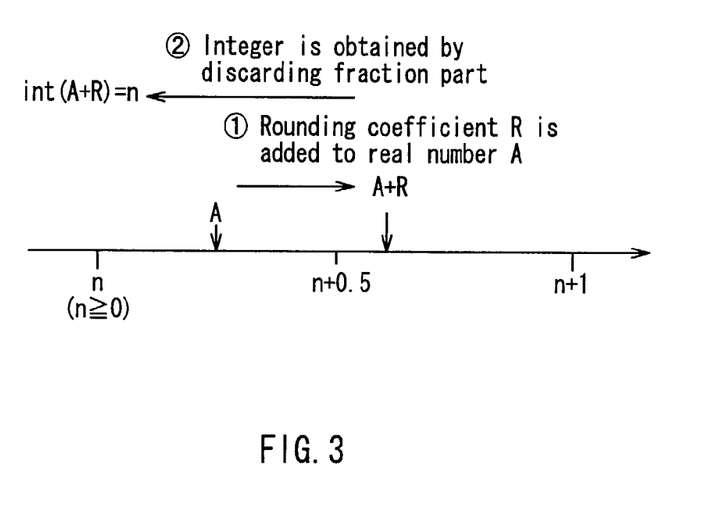
FIG. 3 is a view schematically illustrating a relationship between the rounding and an error in the first embodiment of the present invention.

FIG. 3 is a view schematically illustrating the relationship between a rounding operation and a rounding error.

As shown in FIG. 3, assuming that n represents any positive integer, an operation of rounding a real number to an integer can be described generally as int(A+R), which means that a rounding coefficient R is added to a real number A between n and n+1 and the addition result is rounded down. Here, in the case where the rounding coefficient R is limited to a range of $0 \leq R \leq 1$, the rounding operation is a rounding-up operation when R=1 (① in FIG. 3), whereby the real number A is rounded up to a minimum integer greater than the real number A, i.e., n+1. On the other hand, the rounding operation is a rounding-down operation when R=0, whereby the real number A is rounded down to a maximum integer smaller than the real number A, i.e., n (2 in FIG. 3). Therefore, the result of rounding the real number A, n or n+1, which are two integers sandwiching the real number A, is controlled flexibly according to the value of the rounding coefficient R, and it seems that from the viewpoint of the rounding error, R=0.5 with which the rounding operation is a rounding-off operation is the best solution. However, from the viewpoint of the compression efficiency, R=0 with which the rounding operation is a rounding-down operation minimizes the integer, and allows an advantage of the reduction of the code amount to be achieved. Therefore, as to each of the blocks obtained by division of an input image, the feature detection means 12 detects a significance of the block in the whole image based on features of the image. In the case where the classification means 13 classifies the block as the most significant, that is, in the category with the greatest significance, based on the detection result of the feature detection means 12, the R variation means 21 selects R=0.5, with which the rounding operation carries out the rounding-off (1 in FIG. 3). On the other hand, in the case where the classification means 13 classifies the block as the least significant, that is, in the category with the smallest significance, the R variation means selects R=0, with which the rounding operation carries out the rounding-down. As to blocks classified in the other categories, the R variation means 21 varies the value R in a range of $0 \leq R \leq 0.5$ in proportion with a significance of each block. The addition means 22 adds the division result of the real number and the rounding coefficient R thus selected by the R variation means. Then, the truncation means 23 discards the fractional part thereof.

As described above, the image coding device of the present embodiment is capable of controlling an amount of generated codes as to individual blocks, and no increase is produced in the amount of codes since there is no need to record or transmit additional information.

Second Embodiment

The following will describe, as the present embodiment, a method for detecting feature of blocks by taking advantage of a human visual characteristic with respect to a brightness level. Since an image coding device of the present embodiment has the same configuration as that in the first embodiment, the following description of the present embodiment will focus on the operations of the feature detection means 12 that detects features of blocks and the classification means 13.

Figure 4:
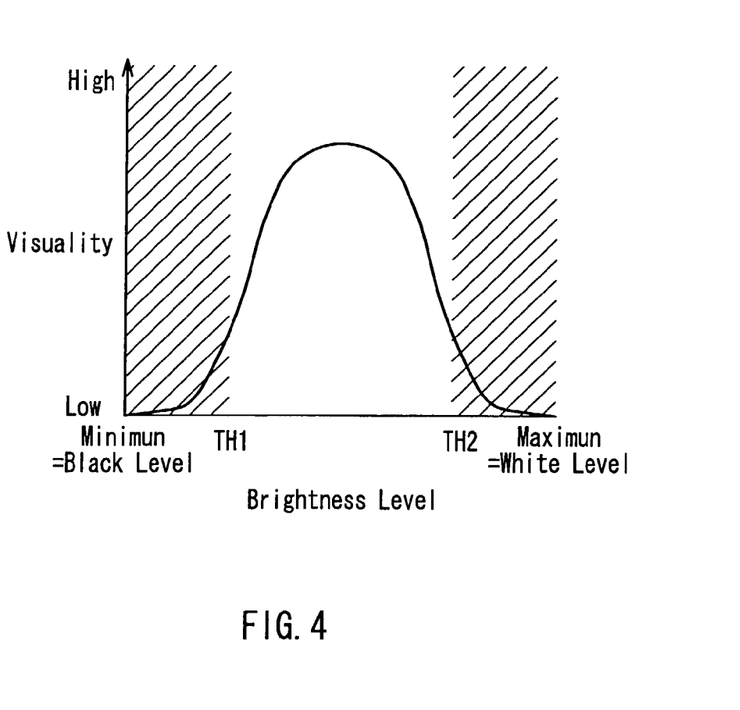
FIG. 4 is a view illustrating a method for detecting features of a block according to a second embodiment of the present invention.

FIG. 4 illustrates a human visual characteristic with respect to brightness levels. The human vision has a characteristic as shown in FIG. 4, and hence, it is unable particularly to distinguish black portions with brightness levels lower than a certain threshold value TH1 (indicated by hatching in FIG. 4) from one another, and to distinguish white portions with brightness levels higher than a certain threshold value TH2 (TH1<TH2) (indicated by hatching in FIG. 4) from one another, even if there are level differences. Therefore, in the case where an average brightness level of a block is in the foregoing ranges, even if a relatively great rounding error occurs, an image quality deterioration cannot be detected visually. Taking advantage of this characteristic, in the present invention, the feature detecting means 12 calculates an average value of brightness levels of a block, and the classification means 13 detects a significance of the block according to the average value of the brightness levels detected by the feature detection means 12, and classifies the block into one of several categories. The classification means 13 classifies blocks in a category for the case where an average value of brightness levels is either lower than the threshold value TH1 or higher than the threshold value TH2 (category 1), and a category for the other cases (category 2). In the case where as a result of the classification a block is classified in the category 1, the R variation means 21 sets the rounding coefficient R to a value smaller than a value in the case of the category 2 (however, $R \geq 0$), so that the rounding error is likely to be discarded by the truncation means 23.

Third Embodiment

The following will describe, as the present embodiment, a method for detecting features of a block by taking advantage of a human visual characteristic with respect to color difference levels. Since an image coding device according to the present embodiment has a configuration identical to that according to the first embodiment, the following description of the present embodiment will focus on the operations of the feature detection means 12 for detecting features of a block and the classification means 13.

Figure 5:
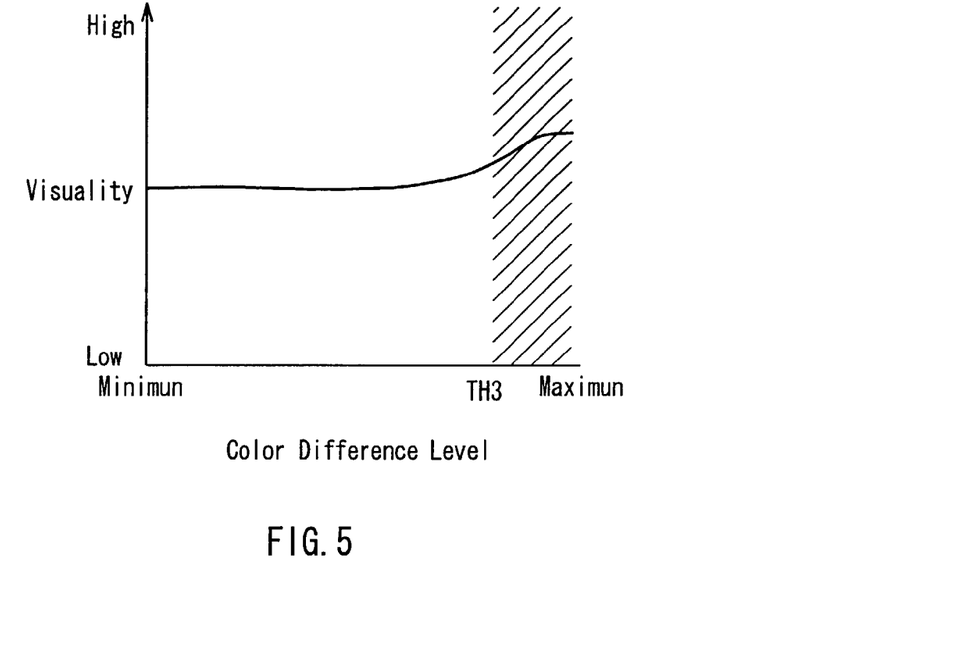
FIG. 5 is a view illustrating a method for detecting features of a block according to a third embodiment of the present invention.

FIG. 5 illustrates a human visual characteristic with respect to color difference levels. The human vision has a characteristic as shown in FIG. 5, and hence, it particularly is able to notice distortion more easily in a portion with a color difference level higher than a threshold value TH3 and with a high color saturation degree (indicated by hatching in FIG. 5). Therefore, in the case where an average of color difference levels of a block is in the foregoing range, the rounding error should be decreased. Taking advantage of the foregoing characteristic, the feature detection means 12 calculates an average of color difference levels of a block, and the classification means 13 classifies the block in one of several categories according to the average value of the color difference levels. The classification means 13 classifies blocks in a category 1 for the case where an average value of the color difference levels is higher than a threshold value TH3, and a category 2 for the other cases. In the case where as a result of the classification a block is classified in the category 1 by the classification means 13, the R variation means 21 sets the rounding coefficient R to a value greater than a value in the case where a block is classified in the category 2 (however, $R \leq 0.5$), so that the rounding coefficient is likely to be rounded off by the truncation means 23.

Fourth Embodiment

The following will describe, as the present embodiment, a method for detecting features of a block by taking advantage of a human visual characteristic with respect to a complexity of an image. Since an image coding device according to the present embodiment has a configuration identical to that according to the first embodiment, the following description of the present embodiment will focus on the operations of the feature detection means 12 for detecting features of a block and the classification means 13.

Figure 6:
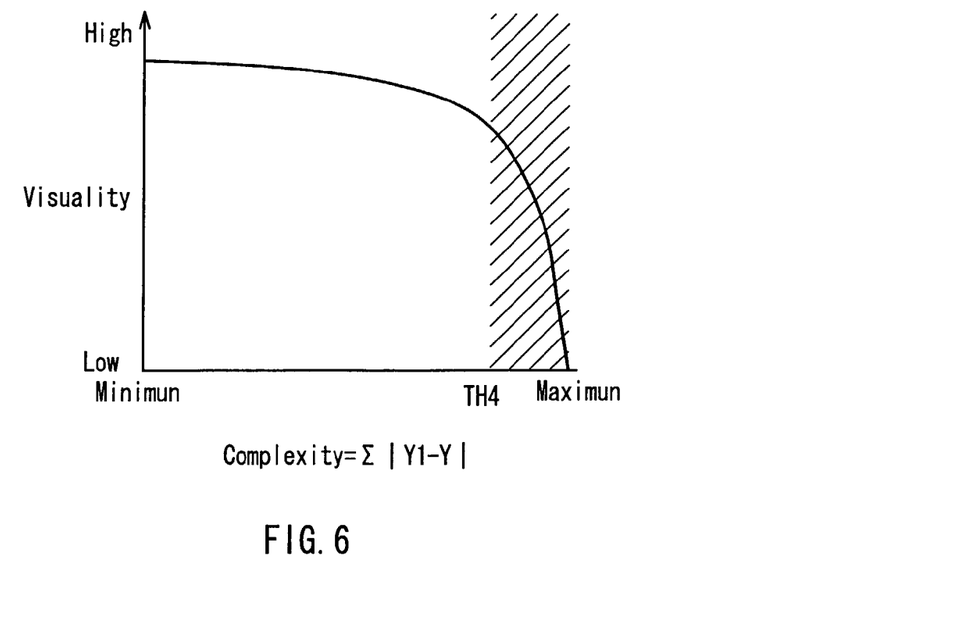
FIG. 6 is a view illustrating a method for detecting features of a block according to a fourth embodiment of the present invention.

FIG. 6 illustrates a human visual characteristic with respect to a complexity of an image in a block. The human vision has a characteristic as shown in FIG. 6, and hence, it is unable to distinguish portions with complexities higher than a certain threshold value TH4 (indicated by hatching in FIG. 6) from one another, even if they have certain level differences therebetween. Therefore, in the case where a complexity of a block is in the foregoing range, even if a relatively great rounding error occurs, an image quality deterioration cannot be detected visually. Taking advantage of this characteristic, the feature detection means 12 calculates a complexity P of a block, which is represented by a sum of absolute values of finite differences of respective pixel levels Yi from an average brightness level Y, the sum being given as Σ|Yi−Y|. The classification means 13 classifies blocks in a category 1 for the case where a complexity P is higher than a threshold value TH4, and a category 2 for the other cases. In the case where as a result of the classification by the classification means 13 a block is classified in the category 1, the R variation means 21 sets the rounding coefficient R to a value smaller than a value in the case where a block is classified in the category 2 (however, R≧0), so that a fractional part is likely to be discarded by the truncation means 23.

Fifth Embodiment

Figure 7:
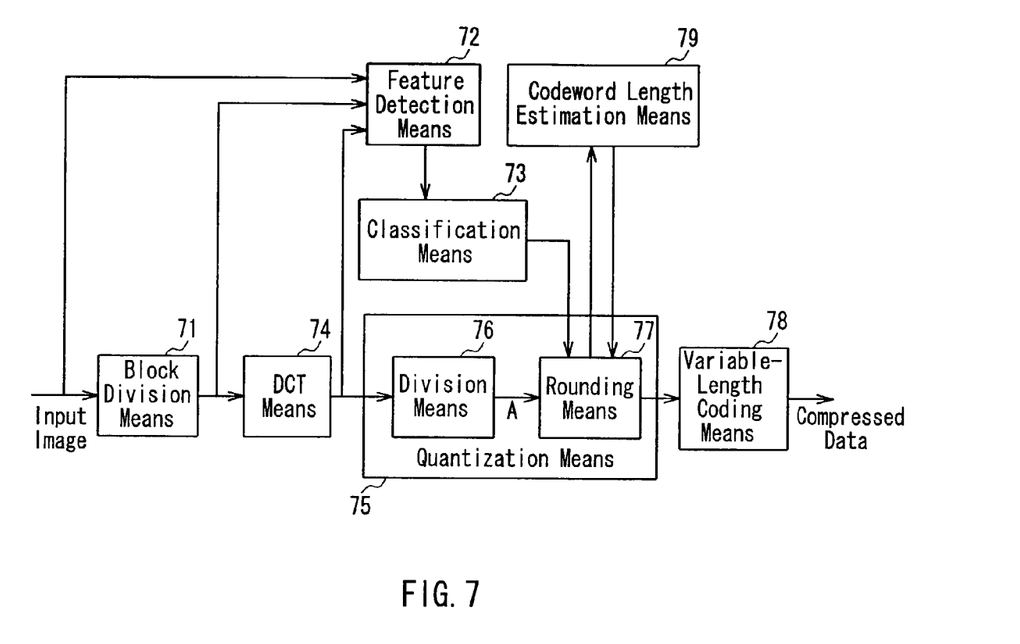
FIG. 7 is a block diagram illustrating a configuration of an image coding device according to a fifth embodiment of the present invention.

FIG. 7 is a block diagram illustrating a configuration of an image coding device according to the present embodiment. FIG. 7 is a block diagram that illustrates an example in which a codeword length estimation means 79 is added to a configuration according to the first embodiment.

In FIG. 7, 71 denotes a block division means that divides an image into blocks. 72 denotes a feature detection means that detects features of an image of each block. 73 denotes a classification means that classifies the block into one of several categories according to a result of the detection by the feature detection means 72. 74 denotes a DCT means that applies DCT to data supplied from the block division means 71. 75 denotes a quantization means that divides a DCT coefficient by a predetermined value and makes the DCT coefficient represented in an integer form. 76 denotes a division means that is provided in the quantization means and that divides the supplied data by a predetermined value. 77 denotes a rounding means that is provided inside the quantization means and that rounds the division result to an integer. 78 denotes a variable-length coding means that encodes data quantized by the quantization means 75 into a variable-length code. 79 denotes a codeword length estimation means that estimates a codeword length of a variable-length code with respect to a certain symbol.

The input image is divided into a plurality of blocks by the block dividing means 71, and the subsequent processing is carried out as to each of the blocks. The DCT means 74 subjects an image of each block to orthogonal transformation to obtain a DCT coefficient. The feature detection means 72 detects features of the image of each block by using the input image or images as a result of division into blocks, the DCT coefficient, and the like. The quantization means 75 quantizes the DCT coefficient by dividing the DCT coefficient by a predetermined value. Therefore, the quantization means 75 requires therein the division means 76 and the rounding means 77 for rounding the division result of the division means 76 to an integer. The codeword length estimation means 79 estimates a codeword length in the case where the DCT coefficient that is quantized and rounded by the rounding means 77 to an integer is represented in a symbol, and estimates whether the codeword length is reduced according to the value of the rounding coefficient R. The DCT coefficient finally is subjected to variable-length coding by the variable-length coding means 78 actually, so that it is recorded or transmitted in a compression data form.

The image coding device according to the present embodiment has a basic configuration similar to that of the first embodiment, except for the following characteristic: in the case where it is an indispensable condition that a final compressed data form is a variable-length code form, by adding a means for estimating a codeword length of a variable-length code, a codeword length is related to the determination of a coefficient R by the rounding means 77. The variable-length coding is a fully reversible coding method that reduces code lengths in the whole data by, in the case where it is known that a symbol inputted has a statistical bias, allocating codewords shorter in length to symbols with higher frequencies, according to the frequency of occurrence of the symbols.

Figure 8:
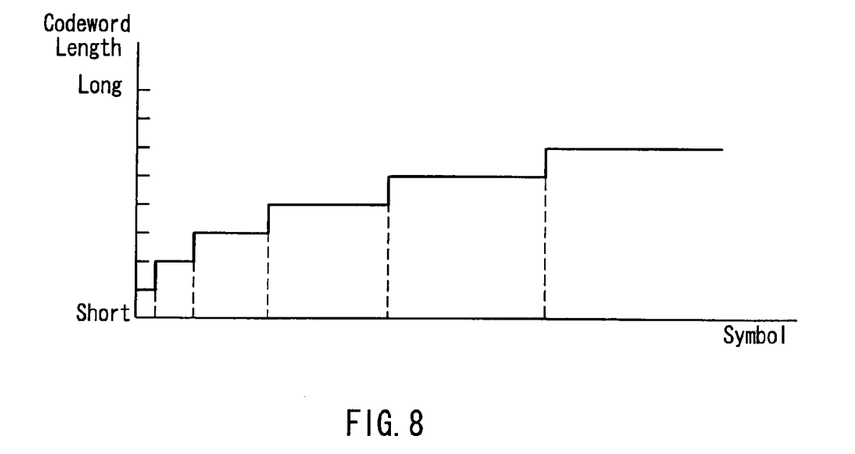
FIG. 8 is a view illustrating a distribution of symbols and variable-length codeword lengths in a fifth embodiment of the present invention.

FIG. 8 is a view illustrating the distribution of symbols and codeword lengths.

In variable-length coding, generally a plurality of symbols are brought together into one group and are encoded into a variable-length code with the same codeword length. Therefore, plotting symbols in the horizontal axis and the length of codewords in the vertical axis, a stepwise codeword length distribution as shown in FIG. 8 is obtained. In FIG. 8, symbols are arranged in the codeword length ascending order from the left. This shows that the number of symbols having the same certain codeword length increases as the codeword length increases. Considering the efficiency in the data compression, it is important to use codes with shorter codeword lengths, in order to reduce the amount of codes as a whole. Therefore, in the present embodiment, in the case where the codeword length estimation means 79 estimates that appropriate variation of the rounding coefficient R causes the fractional part to be discarded thereby making a codeword length of a variable-length code shorter by one level, the rounding means 77 carries out a rounding operation with use of the maximum rounding coefficient R that causes the fractional part to be discarded. By so doing, the rounding error is minimized while the codeword length is decreased by one level. In other words, in the case where it is possible to reduce the codeword length according to the codeword length estimation means 79, the rounding means 77 employs the rounding coefficient R used therein. In the other cases, the rounding means 77 employs the rounding coefficient R determined according to the classification by the classification means 73.

It should be noted that the present invention is described referring to examples of the DCT coding methods mainly, but it is obvious that even in the case where a basic compression transformation mechanism other than the DCT is applied, the adaptive rounding means 77 of the present invention functions effectively.

Furthermore, the second to fourth embodiments are described referring to a case where the classification means 13 carries out classification into two categories, but the invention is not limited to it. The same effect can be achieved in the case of classification into three or more categories.

Furthermore, the foregoing embodiments are described independently, but they may be implemented in combination.

As described above, according to the present invention, in a method for dividing an input image into blocks and compressing and coding the same, it is possible to implement the relative weighting of the blocks in the whole image without additional information that used to be needed to be recorded or transmitted along with the compressed data. Therefore it is possible to achieve high-quality decoded images by subtle control.

Furthermore, even in the case where, as in the MPEG2, the international standards provide that a singularity of a quantization step is used with respect to a macro block integrating a plurality of blocks, it is possible to appropriately weight the plurality of blocks included in the macro block.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image coding device that encodes an image by dividing the image into units of blocks, the image coding device comprising:
   a feature detecting means that detects features of the image as to each block;
   a classification means that classifies each block into one of a plurality of categories according to a result of the detection by the feature detection means;
   a calculation means that performs a predetermined calculation and outputs a result of the calculation, the result being a real number with an integer part and a fractional part; and
   a rounding means that adds a rounding coefficient R ($R \geq 0$) to the result of the calculation that is the real number, and rounds an addition result to the integer part by discarding digits of the fractional part,
   wherein the rounding means varies a value of the rounding coefficient R according to the category into which the classification means classifies the block.

2. The image coding device according to claim 1, wherein
   the feature detecting means detects a significance of a block according to a statistic characteristic of an image signal,
   the classification means classifies the block into a category according to the significance of the block, and
   the rounding means sets the value of the rounding coefficient R to 0.5 when the classification means classifies the block to a category with the highest significance, sets the value of the rounding coefficient R to 0 when the classification means classifies the block into a category with the lowest significance, and varies the value of the rounding coefficient R in a range of $0 \leq R \leq 0.5$ in proportion to the significance of the block when the classification means classifies the block into another category.

3. The image coding device according to claim 2, wherein
   the feature detection means calculates an average value of brightness signal levels as to each block,
   the classification means compares the average value of the brightness signal levels with two threshold values TH1 and TH2 (TH1<TH2), and classifies the block into a category for a case where the average value of the brightness signal levels is smaller than the threshold value TH1 or greater than the threshold value TH2, or a category for the other case, and
   a value of the rounding coefficient R set by the rounding means in the case where the average value of the brightness signal levels is smaller than the threshold value TH1 or greater than the threshold value TH2 is smaller than a value of the rounding coefficient R set by the rounding means in the other case.

4. The image coding device according to claim 2, wherein
   the feature detection means calculates an average value of color difference signal levels as to each block,
   the classification means compares the average value of the color difference signal levels with a threshold value TH3, and classifies the block into a category for a case where the average value of the color difference signal levels is greater than the threshold value TH3, or a category for the other case, and
   a value of the rounding coefficient R set by the rounding means in the case where the average value of the color difference signal levels is greater than the threshold value TH3 is greater than a value of the rounding coefficient R set by the rounding means in the other case.

5. The image coding device according to claim 2, wherein
   the feature detection means calculates a complexity P of each block from a sum of absolute values of finite differences of brightness signal levels Yi of respective pixels from an average value Y of brightness signal levels, the complexity being given as $P=\Sigma|Yi-Y|$,
   the classification means compares the complexity P of the block with a threshold value TH4, and classifies the block into a category for a case where the complexity P is greater than the threshold value TH4, and a category for the other case, and
   a value of the rounding coefficient R set by the rounding means in the case where the complexity P is greater than the threshold value TH4 is smaller than a value of the rounding coefficient R set by the rounding means in the other case.

6. The image coding device according to claim 1, wherein
   the feature detection means calculates an average value of brightness signal levels as to each block,
   the classification means compares the average value of the brightness signal levels with two threshold values TH1 and TH2 (TH1<TH2), and classifies the block into a category for a case where the average value of the brightness signal levels is smaller than the threshold value TH1 or greater than the threshold value TH2, or a category for the other case, and
   a value of the rounding coefficient R set by the rounding means in the case where the average value of the brightness signal levels is smaller than the threshold value TH1 or greater than the threshold value TH2 is smaller than a value of the rounding coefficient R set by the rounding means in the other case.

7. The image coding device according to claim 1, wherein
   the feature detection means calculates an average value of color difference signal levels as to each block,
   the classification means compares the average value of the color difference signal levels with a threshold value TH3, and classifies the block into a category for a case where the average value of the color difference signal levels is greater than the threshold value TH3, or a category for the other case, and
   a value of the rounding coefficient R set by the rounding means in the case where the average value of the color difference signal levels is greater than the threshold value TH3 is greater than a value of the rounding coefficient R set by the rounding means in the other case.

8. The image coding device according to claim 1, wherein
   the feature detection means calculates a complexity P of each block from a sum of absolute values of finite differences of brightness signal levels Yi of respective pixels from an average value Y of brightness signal levels, the complexity being given as $P=\Sigma|Yi-Y|$, the classification means compares the complexity P of the block with a threshold value TH4, and classifies the block into a category for a case where the complexity P is greater than the threshold value TH4, and a category for the other case, and a value of the rounding coefficient R set by the rounding means in the case where the complexity P is greater than the threshold value TH4 is smaller than a value of the rounding coefficient R set by the rounding means in the other case.

9. An image coding device that encodes an image by dividing the image into units of blocks, the image coding device comprising:

a feature detecting means that detects features of the image as to each of the blocks;

a classification means that classifies each block into one of a plurality of categories according to a result of the detection by the feature detection means;

a calculation means that performs a predetermined calculation for quantization, and outputs a result of the calculation, the result being a real number with an integer part and a fractional part;

a rounding means that adds a rounding coefficient R ($R \geq 0$) to the result of the calculation that is the real number, and rounds an addition result to the integer part by discarding digits of the fractional part;

a codeword length estimation means that estimates a length of a variable-length code according to a frequency of occurrence of the calculation result rounded to the integer; and a variable-length coding means that actually allocates the variable-length code estimated by the codeword length estimation means to the calculation result so as to encode the calculation result, wherein the rounding means varies the rounding coefficient R according to the category into which the classification means classifies the block, and in the case where the codeword length estimation means estimates that a length of the variable-length code is reduced, the rounding means sets the rounding coefficient R to the value that causes the length of the variable-length code to be reduced.

10. The image coding device according to claim 9, wherein the feature detecting means detects a significance of a block according to a statistic characteristic of an image signal, the classification means classifies the block into a category according to the significance of the block, and the rounding means sets the value of the rounding coefficient R to 0.5 when the classification means classifies the block into a category with the highest significance, sets the value of the rounding coefficient R to 0 when the classification means classifies the block into a category with the lowest significance, and varies the value of the rounding coefficient R in a range of $0 \leq R \leq 0.5$ in proportion to the significance of the block when the classification means classifies the block to another category.

11. The image coding device according to claim 10, wherein the feature detection means calculates an average value of brightness signal levels as to each block, the classification means compares the average value of the brightness signal levels with two threshold values TH1 and TH2 (TH1<TH2), and classifies the block into a category for a case where the average value of the brightness signal levels is smaller than the threshold value TH1 or greater than the threshold value TH2, or a category for the other case, and a value of the rounding coefficient R set by the rounding means in the case where the average value of the brightness signal levels is smaller than the threshold value TH1 or greater than the threshold value TH2 is smaller than a value of the rounding coefficient R set by the rounding means in the other case.

12. The image coding device according to claim 10, wherein the feature detection means calculates an average value of color difference signal levels as to each block, the classification means compares the average value of the color difference signal levels with a threshold value TH3, and classifies the block into a category for a case where the average value of the color difference signal levels is greater than the threshold value TH3, or a category for the other case, and a value of the rounding coefficient R set by the rounding means in the case where the average value of the color difference signal levels is greater than the threshold value TH3 is greater than a value of the rounding coefficient R set by the rounding means in the other case.

13. The image coding device according to claim 10, wherein the feature detection means calculates a complexity P of each block from a sum of absolute values of finite differences of brightness signal levels Yi of respective pixels from an average value Y of brightness signal levels, the complexity being given as $P=\Sigma|Yi-Y|$, the classification means compares the complexity P of the block with a threshold value TH4, and classifies the block into a category for a case where the complexity P is greater than the threshold value TH4, and a category for the other case, and a value of the rounding coefficient R set by the rounding means in the case where the complexity P is greater than the threshold value TH4 is smaller than a value of the rounding coefficient R set by the rounding means in the other case.

14. The image coding device according to claim 9, wherein the feature detection means calculates an average value of brightness signal levels as to each block, the classification means compares the average value of the brightness signal levels with two threshold values TH1 and TH2 (TH1<TH2), and classifies the block into a category for a case where the average value of the brightness signal levels is smaller than the threshold value TH1 or greater than the threshold value TH2, or a category for the other case, and a value of the rounding coefficient R set by the rounding means in the case where the average value of the brightness signal levels is smaller than the threshold value TH1 or greater than the threshold value TH2 is smaller than a value of the rounding coefficient R set by the rounding means in the other case.

15. The image coding device according to claim 9, wherein the feature detection means calculates an average value of color difference signal levels as to each block, the classification means compares the average value of the color difference signal levels with a threshold value TH3, and classifies the block into a category for a case where the average value of the color difference signal levels is greater than the threshold value TH3, or a category for the other case, and a value of the rounding coefficient R set by the rounding means in the case where the average value of the color difference signal levels is greater than the threshold value TH3 is greater than a value of the rounding coefficient R set by the rounding means in the other case.

16. The image coding device according to claim 9, wherein the feature detection means calculates a complexity P of each block from a sum of absolute values of finite differences of brightness signal levels Yi of respective pixels from an average value Y of brightness signal levels, the complexity being given as $P=\Sigma|Yi-Y|$, the classification means compares the complexity P of the block with a threshold value TH4, and classifies the block into a category for a case where the complexity P is greater than the threshold value TH4, and a category for the other case, and a value of the rounding coefficient R set by the rounding means in the case where the complexity P is greater than the threshold value TH4 is smaller than a value of the rounding coefficient R set by the rounding means in the other case.

17. An image coding method for encoding an image by dividing the image into units of blocks, the image coding method comprising:

detecting features of the image as to each block;

classifying the block into one of a plurality of categories according to a result of the detection;

performing a predetermined calculation with respect to the block;

adding a rounding coefficient R varied according to the category to a result of the calculation, the result being a real number with an integer part and a fractional part, and rounding a result of the addition to the integer part by discarding digits of the fractional part, for compression.

18. An image coding method for encoding an image by dividing the image into units of blocks, the image coding method comprising:

detecting features of the image as to each block;

classifying the block into one of a plurality of categories according to a result of the detection;

performing a predetermined calculation with respect to the block;

adding a rounding coefficient R varied according to the category to a result of the calculation, the result being a real number with an integer part and a fractional part, and rounding a result of the addition to the integer part by discarding digits of the fractional part, for compression; and estimating a length of a variable-length code according to the category, wherein in the case where the length of the variable-length code is estimated to be reduced, a value of the rounding coefficient R that causes the length of the variable-length code to be reduced is employed.

* * * * *